No. 762,185. PATENTED JUNE 7, 1904.
L D MOUSER.
ANIMAL TRAP.
APPLICATION FILED AUG. 5, 1903.
NO MODEL.
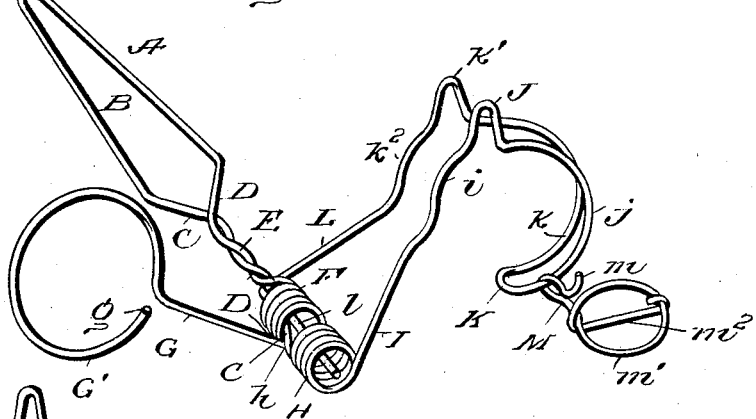
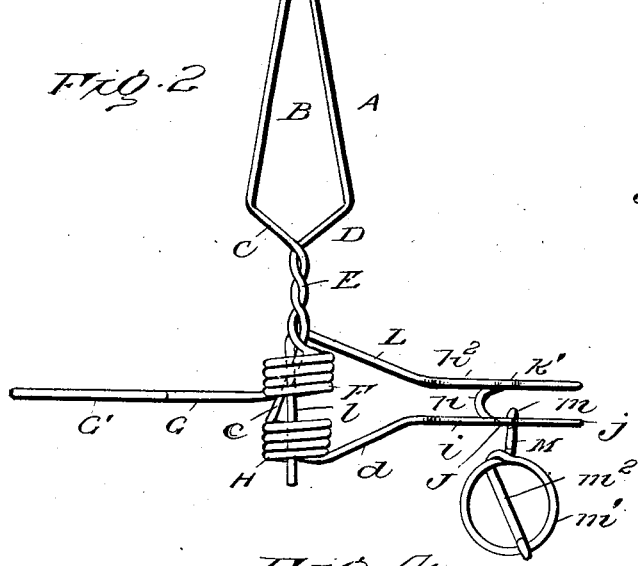
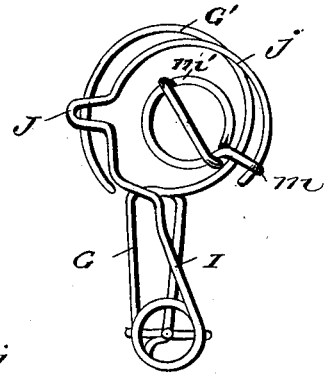
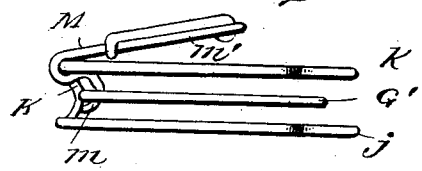
Witnesses
Inventor
L. D. Mouser,
By A. S. Pattison,
Attorney No. 762,185.

Patented June 7, 1904.

UNITED STATES PATENT OFFICE.

L D MOUSER, OF HASTINGS, NEBRASKA, ASSIGNOR OF ONE-HALF TO WILLIAM MADGETT, OF HASTINGS, NEBRASKA.

ANIMAL-TRAP.

SPECIFICATION forming part of Letters Patent No. 762,185, dated June 7, 1904.

Application filed August 5, 1903. Serial No. 168,343. (No model.)

*To all whom it may concern:*

Be it known that I, L D MOUSER, a citizen of the United States, residing at Hastings, in the county of Adams and State of Nebraska, have invented new and useful Improvements in Animal-Traps, of which the following is a specification.

My invention relates to improvements in animal-traps, and pertains more particularly to that class which is adapted to be applied over a hole of a burrowing animal and which is adapted to catch the animal around the neck and choke it.

The object of my invention is to provide a trap of this character which is adapted to be placed over a hole of the burrowing animal and said trap so constructed that it is applied in the same manner; but it can be set so that the animal will trip the same when entering said opening, or it can be so set that it will trip the same when coming out of said opening.

Another object of my invention is to provide a trap of this character in which the body or two jaws are made of a single piece of spring-metal wire, which forms a more simple, cheap, and durable trap than has heretofore been produced.

In the accompanying drawings, Figure 1 is a perspective view of my improved trap before it is set. Fig. 2 is a top plan view of Fig. 1. Fig. 3 is an end view of my improved trap after it has been set. Fig. 4 is an enlarged top plan view, partly broken away, showing the trap set to be sprung from one side. Fig. 5 is an enlarged top plan view, partly broken away, showing the trap set to be sprung from the opposite side from that shown in Fig. 4.

Referring now to the drawings, A represents a piece of steel spring-wire, which is bent or has formed therein intermediate its ends a loop B, by means of which the trap is fastened to the ground or other place where traps of this character are to be used, as hereinafter more fully described. The two portions C and D of the wire A, forming the loop B, are twisted together at E, and thus the elongated loop B is formed therein. The wire D beyond the twisted portion E is formed into several coils F around the straight portion $c$ of the wire C, and any number of coils F may be used. While I have shown four, more or less can be used. This coil F is coiled to the left—or, in other words, a left-hand coil—and the wire D extends at right therefrom into the straight portion G, which has formed in its outer end a circular choking loop or ring G', and the end of the wire G terminates at $g$. The wire C is provided, as before stated, with the straight portion $c$, which extends through the coil F, or, in other words, the coil is wound around the portion $c$, and said wire C beyond the coil F is coiled to the right at $h$, forming a right-hand coil H, which has the same number of coils as the coil F, whether it be two, three, or four, thus making them equal in strength and elasticity. The wire C of which the coil H is made is continued into a laterally-extending straight portion I, which is of a length a little less than that of the straight portion G of the wire and extends in the opposite direction, or, in other words, from the opposite side of the coil to that of the straight portion I of the coil F. From the straight portion I the wire is curved upwardly at $i$ and is provided with the outwardly obliquely arranged elongated loop J, and the wire is continued to curve at $j$, thus forming practically a circular loop or a greater portion thereof. The wire is doubled at K and bent backward, having the curved portion $k$ correspondingly parallel and oppositely arranged to the portion $j$, and has a loop $k'$, corresponding to the loop $j$, and a curved portion $k^2$, corresponding to the curved portion $i$. The wire is from the said curved portion continued with the straight portion L parallel with the straight portion I and has its outer free end $l$ bent at right angles and passing through the two loops F and H, and thus the free two straight portions of the wire are held in a relatively parallel position.

The two wires L and I are some distance apart, and thus the loop G' is adapted to be sprung between the two members against the tension of both of the springs F and H, and the loops $j$ and $k'$ serve as guides for guiding the loop G' within the double loop. The outer doubled portion K has loosely mounted thereon a piece of wire M, which has one end formed into a hook $m$, which is adapted to catch the loop or ring G' and hold it in a position within the opposite member, and thus the two loops are held in an alinement with each other, so that the openings therein register with each other, and through which the animal is adapted to pass. The opposite end of the wire M is formed into a ring $m'$, which has extending thereacross the extreme outer end $m^2$ of the wire M, and thus it will be seen that I form a trigger which when the loop $m$ is caught into the loop G' the ring $m'$ extends across the opening, and thus the animal cannot pass through the loop from the direction indicated by arrow in Fig. 4 without tripping the trap. The said trigger is loosely mounted on the loop K, and when it is desired to set the trap so that the animal will trip it from the opposite direction the ring is moved around the loop K on the portion $k$, and thus the hook is pointed in the opposite direction and the trap is tripped from exactly the opposite direction.

The trap is adapted to be set over an opening of any description, and by the above description it will be seen that the trap can be set so that it will be tripped by an animal entering the opening, or it can be set so that it will be tripped by an animal coming out of the opening.

The choking-loop G' is swung or sprung over between the two guiding-loops J and $k'$ and is continued to be forced between the arc-shaped member and is caught on the hook $m$ of the trigger M, carried by the loop K, and thus it is placed over the opening, and the animal is obliged to pass its head through the loop G', and its head will engage the trigger M, thus releasing the loop G', which will catch the animal's head or neck between it and the curved portions $i$ and $k^2$ and choke it. The loop B is for the purpose of securing it to the ground or other place for which the trap of this character is adapted to be used.

Having thus described my invention, what I claim as new, and desire to secure by Letters Patent, is—

1. An animal-trap comprising spring-loops formed of a single piece of wire, and means for holding said loops in an alinement.

2. An animal-trap, comprising spring-loops formed of a single piece of wire, and a trigger carried by one of said loops and adapted to hold the said loops in an alinement.

3. An animal-trap comprising spring-loops formed of a single piece of wire, and a reversible trigger carried by one of said loops and adapted to hold the said loops in an alinement.

4. An animal-trap comprising spring-loops formed of a single piece of wire, and a trigger carried by one of said loops and extending across the same and adapted to hold the said loops in an alinement.

5. An animal-trap comprising spring-loops formed of a single piece of wire, and a reversible trigger carried by one of said loops and adapted to extend across the same from either side.

6. An animal-trap comprising spring-loops formed of a single piece of wire, and a reversible trigger carried by one of said loops and adapted to engage the opposite loop, and extending across the same from either side.

7. An animal-trap comprising spring-loops formed of a single piece of wire, and a trigger for holding said loops in an alinement with each other.

8. An animal-trap comprising spring-loops formed of a single piece of wire, and a reversible trigger for holding said loops in an alinement with each other.

9. An animal-trap comprising a left and right hand coil made of a single piece of wire, loops carried by said coils on opposite sides and a trigger for holding said loops in an alinement with each other against the tension of the coils.

10. An animal-trap comprising a left and right hand coil made of a single piece of wire, a loop carried by each coil on opposite sides, and a trigger carried by one of said loops and holding the opposite loop in an alinement therewith against the tension of the coils.

11. An animal-trap comprising a right and left hand coil formed of a single piece of wire, a single loop formed as a part of one of said coils, a double loop formed as a part of the opposite coil and a trigger carried by the double loop and adapted to hold the single loop in alinement with the double loop.

12. An animal-trap comprising two coils formed in a single piece of wire, a loop carried by each of said coils, and a trigger carried by one of said loops and adapted to hold the opposite loop in alinement therewith.

13. An animal-trap comprising two coils formed in a single piece of wire, a single loop carried by one coil, a double loop carried by the other coil and extending in the opposite direction, and a trigger carried by the double loop and adapted to hold the single loop within the double loop.

14. An animal-trap, comprising a right and left hand coil formed of a single piece of wire, a single loop carried by the left-hand coil, a double loop carried by the right-hand coil, and extending in opposite directions to that of the single loop, and a reversible trigger carried by the double loop and adapted to hold the single loop therein.

15. An animal-trap, comprising a right and left hand coil formed of a single piece of wire, a loop carried by each coil on opposite sides, and a trigger adapted to hold said loops in an alinement.

16. An animal-trap comprising a right and left hand coil formed of a single piece of wire, a loop carried by each coil and formed of the same piece of wire, and a trigger adapted to hold said loops in alinement.

17. An animal-trap comprising spring-loops formed of a single piece of wire, a trigger formed of a single piece of wire looped around one of said loops, and extending across the same, and a hook formed therein and engaging and holding the opposite loop in an alinement with the first loop.

18. An animal-trap comprising a single piece of wire formed with an eye intermediate its ends, a coil formed in one end of said wire, and continued into a loop, the other end of said wire formed into an oppositely-arranged coil and continued into a double loop, and means for holding the single loop within the double loop.

19. An animal-trap comprising a single piece of wire formed with an eye intermediate its ends, a coil formed in one end of said wire and continued into a loop, the other end of said wire formed into a coil which is continued into a loop which is doubled and brought back and passed through the said coils and means for holding the single loop within the double loop.

20. An animal-trap, comprising a single piece of wire formed with an elongated eye intermediate its ends, a coil formed in one end of said wire, and continued into a loop, the other end of the wire passing through the coil and formed into an oppositely-arranged coil which is continued into a loop which is doubled and brought back and the end bent at right angles and passed through the said coils.

21. An animal-trap comprising two spring-loops, and a reversible trigger carried by one of said loops.

22. An animal-trap comprising members formed of a single piece of wire and adapted to be swung past each other and means for holding said members in said position.

23. An animal-trap comprising spring members and a reversible trigger carried by one of said members.

24. An animal-trap comprising spring members formed of a single piece of wire, and adapted to swing past each other and a reversible trigger carried by one of said members.

25. An animal-trap comprising a single piece of wire formed with an elongated eye intermediate its ends, a coil formed in one end of said wire and continued into a loop, the other end of the wire passing through the coil and formed into an oppositely-arranged coil which is continued into a loop, which is doubled and brought back and the end bent at right angles and passed through the said coil, and a reversible trigger carried by one of said loops.

In testimony whereof I have hereunto set my hand in the presence of two subscribing witnesses.

L D × MOUSER.
his mark

Witnesses:
   J. W. KILE,
   MARGARET MULLANEY.